2,821,532

REDUCTION OF CARBONYLIC RADICALS IN INDOLYL-3 COMPOUNDS

William C. Anthony, Kalamazoo Township, Kalamazoo County, and Jacob Szmuszkovicz, Portage Township, Kalamazoo County, Mich., assignors to The Upjohn Company, Kalamazoo, Mich., a corporation of Michigan No Drawing. Application April 11, 1955
Serial No. 500,662

16 Claims. (Cl. 260—319)

The present invention relates to a novel process for the preparation of 1-hydro-3-(amino-1-hydroxyhydrocarbyl)-indoles and to novel compounds produced therein. More particularly, the invention is concerned with the reduction of 1-hydro-3-indolyl aminohydrocarbyl ketones to produce 1-hydro-3-(amino-1-hydroxyhydrocarbyl)-indoles.

The term "hydrocarbyl" as used herein includes any hydrocarbon radical which connects the amino fragment of a starting 1-hydro-3-indolyl aminohydrocarbyl ketone to the carbonyl group which is attached to the indole nucleus at position 3. The term "1-hydroxyhydrocarbyl" includes any 1-hydroxy substituted hydrocarbon radical which connects the amino fragment of a product, a 1-hydro-3-(amino-1-hydroxyhydrocarbyl)-indole, to the indole nucleus at position 3, the carbinol group of said radical being adjacent to said indole nucleus. The term "1-hydro" is used to denote the presence of hydrogen in the 1-position of the indole nucleus.

Previous attempts have been made to reduce a 1-hydro-3-indolyl aminohydrocarbyl ketone but the attempts were not successful. Salway, J. Chem. Soc. 103, 351–361 (1913) attempted to reduce dimethylaminomethyl 2-methyl-3-indolyl ketone with various reducing agents but had no success.

Now it has been unexpectedly found that 1-hydro-3-indolyl aminohydrocarbyl ketones can be readily reduced with sodium borohydride. The novel process affords an easy approach to the synthesis of 1-hydro-3-(amino-1-hydroxyhydrocarbyl)-indoles having branched-chain or longer straight-chain (i. e., a chain in excess of two carbon atoms) substituents in the 3-position of the indole nucleus which prior to the novel process of the present invention were extremely difficult or impossible to prepare.

Thus it is an object of the present invention to provide a novel process for the preparation of 1-hydro-3-(amino-1-hydroxyhydrocarbyl)-indoles. It is a further object of the present invention to provide a novel process for the preparation of 1-hydro-3-(amino-1-hydroxyhydrocarbyl)-indoles by reducing 1-hydro-3-indolyl aminohydrocarbyl ketones with sodium borohydride.

It is a further object to produce novel and stable 1-hydro-3-(amino-1-hydroxyhydrocarbyl)-indoles having pharmacological activity. Further objects will appear as the description proceeds.

The products produced by the process of the present invention, 1-hydro-3-(amino-1-hydroxyhydrocarbyl)-indoles, can, for the most part, be represented by the following general formula:

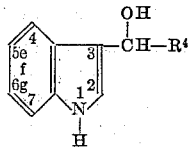

wherein $R^4$ represents an N-heterocyclic amino radical attached at a carbon position, e. g., isoquinolyl, pyridyl, reduced isoquinolyl, and the like, and $R^4$ also represents

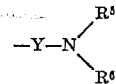

wherein Y represents an alkylene, arylene, and aralkylene radical, and advantageously contains up to about fifteen carbon atoms. $R^5$ and $R^6$ taken individually represent hydrogen, aryl, aralkyl, and alkyl. $R^5$ and $R^6$ taken together with —N< can also represent a heterocyclic amino radical, such as morpholinyl, piperidyl, pyrrolidyl, thiamorpholinyl, hexamethyleneimino, decahydroisoquinolyl, hexahydroisoquinolyl (both cis and trans), and the like. $R^5$ and $R^6$ advantageously contain together not more than a total of fifteen carbon atoms.

The 4-, 5-, 6-, and 7-positions of the benzene ring can include such substituents as hydrogen; halogen, e. g., chlorine, bromine, and the like; a cyano radical; a carboxy radical; a lower-carbalkoxy radical, e. g., carbomethoxy, carbobutoxy, and the like; a dialkylamino radical, e. g., dimethylamino, diethylamino, and the like; a benzyloxy radical, e. g., benzyloxy, benzhydryloxy, and the like; a lower-alkoxy radical containing up to nine carbon atoms, e. g., methoxy, octoxy, and the like; an acyloxy radical wherein the acyl substituent is from an organic carboxylic acid containing from one to eight carbon atoms, e. g., acetoxy, propionoxy, capryloxy, and the like; a lower-alkyl radical containing up to nine carbon atoms, e. g., methyl, ethyl, propyl, octyl, and the like; an aralkyl radical, e. g., benzyl, phenethyl, and the like; an aryl radical, e. g., phenyl, naphthyl, and the like; an aryloxy radical, e. g., phenoxy, naphthoxy, and the like; and a fused arylene radical, e. g., phenylene, naphthylene, and the like. A fused arylene radical encompasses a divalent arylene radical which is fused at positions e, f, or g of the benzene ring of the indole nucleus. The 4-, 5-, 6-, and 7-position substituents can be alike or different but it is understood that hydrogen is located in the positions not occupied by other substituents. The 2-position can be occupied by hydrogen, lower-alkyl, aryl, or an aralkyl radical.

Preparation of the 1-hydro-3-indolyl aminohydrocarbyl ketones which can be employed in the present process is more fully disclosed in copending application Serial Number 426,302, filed April 28, 1954.

In carrying out the process of the present invention 1-hydro-3-indolyl aminohydrocarbyl ketones having the general formula:

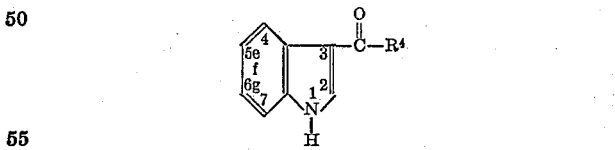

wherein $R^4$ is as given above and the 2-, 4-, 5-, 6-, and 7-positions can be substituted as given above, are reacted with sodium borohydride. The reduction is advantageously accomplished at a temperature between about 25 degrees and about 35 degrees centigrade although temperatures from about zero to about 60 degrees centigrade can also be employed. At temperatures up to about 35 degrees centigrade the reaction can be conducted for a period of time between about one hour to about 48 hours but in the temperature range between about 35 degrees centigrade and about 60 degrees centigrade the reaction is completed between about five minutes and about one hour, the shorter period of time being required at the higher temperatures. The reaction can be carried out by using a solvent such as the lower-alkanols, e. g., methyl alcohol, ethyl alcohol, isopropyl alcohol, and the like, tetrahydrofuran, n-ethylmorpholine, dioxan, and water, with the lower-alkanols being preferred.

The resulting 1-hydro-3-(amino-1-hydroxyhydrocarbyl)-indoles can be recovered from the reaction mixtures by conventional means, e. g., extracting with an immiscible solvent, drying the combined solvent extracts utilizing, e. g., anhydrous potassium carbonate, and evaporating to dryness. The 1-hydro-3-(amino-1-hydroxyhydrocarbyl)-indoles can be further purified, if so desired, by conventional procedures such as recrystallization or rectification. For example, a preferable manner of procedure includes heating the 1-hydro-3-(amino-1-hydroxyhydrocarbyl)-indoles with ethyl acetate, filtering, adding Skellysolve B (mixture of hexanes) to the filtrate, and concentrating the filtrate to dryness under reduced pressure.

The 1-hydro-3-(amino-1-hydroxyhydrocarbyl)-indoles thus obtained can be converted to acid addition salts, if so desired. For example, a solution of the desired acid addition salt can be prepared by mixing stoichiometric amounts of a free base of the invention and an inorganic or organic acid in the presence of water. Examples of acids are hydrochloric, hydrobromic, sulfuric, phosphoric, pyruvic, acetic, tartaric, citric, benzoic, trichloroacetic, and the like. A quaternary ammonium salt such as the methoiodide, ethoiodide, benzyl chloride, and the like may also be prepared by reacting the tertiary amine free base in a suitable inert solvent with dimethyl sulfate, or an alkyl or aralkyl halide.

In addition to the reduction of the carbonyl group to carbinol in the present process, other groups attached to the benzene nucleus are susceptible to reduction or cleavage. If a substituent is affected by a reagent used, it means only that the substituent on the product will be different from that on the starting compound and the only adverse effect is that more of the reagent will be required to affect the desired reduction in the 3-substituted group. Thus the indole nucleus can be substituted as desired without affecting the characteristic and desired reduction of the 3-substituent group in accordance with the invention.

The preparation of 1-hydro-3-indolyl aminohydrocarbyl ketones employed in the novel process, except in those instances wherein a cyano, carbalkoxy, carboxy, or acyloxy radical is on the benzene ring, can be readily accomplished by utilizing processes well known in the art, e. g., Salway, supra, prepared a 1-hydro-3-indolyl aminohydrocarbyl ketone by reacting a 1-hydroindole with a Grignard reagent to produce a 1-hydroindole Grignard reagent, and reacting the thus-produced 1-hydroindole Grignard reagent with a haloacyl halide to produce a 1-hydro-3-indolyl halohydrocarbyl ketone. In some instances in addition to the desired 1-hydro-3-indolyl halohydrocarbyl ketone a 1-haloacyl-3-indolyl halohydrocarbyl ketone may result, but the 1-haloacyl substituent is readily cleaved to produce an addition quantity of 1-hydro-3-indolyl halohydrocarbyl ketone. (Saxton, J. Chem. Soc. 1952, 3592.) The 1-hydro-3-indolyl halohydrocarbyl ketone is thereupon reacted with ammonia, or a primary or a secondary amine, to produce the desired 1-hydro-3-indolyl aminohydrocarbyl ketone. The procedure of Salway, supra, can be used.

Since the cyano, carbalkoxy, carboxy, or acyloxy substituents are susceptible to cleavage under the drastic Grignard conditions, outlined above, the Saxton procedure, supra, can be employed to prepare these substituted 1-hydro-3-indolyl halohydrocarbyl ketones, e. g., the starting 1-hydroindole can be dissolved in a mixture of chloroacetic anhydride and chloroacetic acid, the mixture heated to reflux, the excess anhydride removed by distillation, the residue added to water, and the resulting precipitate purified by recrystallization.

Other procedures can also be utilized for preparing the desired 1-hydro-3-indolyl aminohydrocarbyl ketones. For example, certain amino acyl halides, such as nicotinic acid halides, isonicotinic acid halides, isoquinaldinic acid halides, reduced isoquinaldinic acid halides, dimethylaminobenzoyl halides, and the like, can be reacted directly with the 1-hydro-3-indole Grignard to give the desired 1-hydro-3-indolyl aminohydrocarbyl ketones. The procedure involves the preparation of the acid halide, e. g., nicotinic acid halide, isonicotinic acid halide, isoquinaldinic acid halide, reduced isoquinaldinic acid halide, p-dimethylaminobenzoyl halide, etc., by reacting the corresponding acid with a thionyl halide, and thereupon reacting the resulting organic acid halide with the desired 1-hydro-3-indole Grignard.

Numerous procedures are available for the preparation of the halo acyl halides employed in the present process. For example, the well known Hell-Volhard-Zelinsky reaction [Ann. Rep. Chem. Soc. (London) (1912), 83] or modifications thereof, can be employed to prepare various α-halo acyl halides. Other halides such as β or γ, etc., halo acyl halides can be prepared by halogenation of halogenated acids (Whitmore—"Organic Chemistry"— D. Van Nostrand Co., 2nd ed., 1951, pages 273–279 and 288–289). In addition, if so desired, the process outlined in U. S. Patent 2,411,875 may be employed to prepare β-halo acyl halides. Representative halo acyl halides which can be so prepared include the following: α-haloacetyl halide, α-halopropionyl halide, α-halo-α-phenylacetyl halide, β-halomethyl-β-(α-naphthyl)-butyryl halide, γ-halo-β-methylpropionyl halide, β-halo-β-phenethylpropionyl halide, β-halo-α-benzylpropionyl halide, β-halo-β-phenylpropionyl halide, p-halobenzoyl halide, β-halopropionyl halide, γ-halobutyryl halide, β-halo-α-(α-naphthyl)-butyryl halide, β-halo-β-(para-chlorobenzyl)-propionyl halide, γ-halo-α-methyl-α-ethylbutyryl halide, β-halo-α-ethyl-β-benzylpropionyl halide, ε-halo-β-ethylhexanoyl halide, β-halo-α-phenylpropionyl halide, γ-halohexanoyl halide, β-halomethyl-γ-phenylbutyryl halide, and the like.

The various substituted 1-hydroindoles which are employed in the preparation of the 1-hydro-3-indolyl halohydrocarbyl ketones can be prepared by various processes more fully outlined in copending application Serial Number 426,302, filed April 28, 1954.

The compounds of the present invention have hypotensive and diuretic activity. In addition the compounds of the present invention can be converted by lithium aluminum hydride to pharmacologically active 3-(aminohydrocarbyl)-indoles, e. g., 5-hydroxy-3-(2-dimethylaminoethyl)-indole (bufotenine) can be produced by reducing 5-hydroxy-3-(2-dimethylamino-1-hydroxyethyl)-indole with lithium aluminum hydride in tetrahydrofuran. Furthermore, the compounds of the invention can be reacted with fluosilicic acid to form the fluosilicate salts which in dilute aqueous solutions are effective mothproofing agents as more fully disclosed in U. S. Patents 2,075,359 and 1,915,334. The 1-hydro-3-(secondary and tertiary amino-1-hydroxyhydrocarbyl)-indoles of the present invention are especially valuable pharmacologicals since they are stable and require no extraordinary measures to prevent decomposition and loss of activity. This is in contrast to the 1-hydro-3-(primary amino-1-hydroxyhydrocarbyl)-indoles which are unstable.

The following examples are illustrative of the process and products of the present invention, but are not to be construed as limiting.

EXAMPLE 1.—PREPARATION OF 3-(2-DIMETHYL-AMINO-1-HYDROXYETHYL)-INDOLE

A. *Dimethylaminomethyl 3-indolyl ketone*

Six grams of crude chloromethyl 3-indolyl ketone was mixed with 200 milliliters of benzene and anhydrous dimethylamine was passed into the mixture for thirty minutes. The pasty mixture was permitted to stand for twelve hours, and additional dimethylamine was added under reflux for twenty minutes. The mixture was filtered and excess dimethylamine was removed under reduced pressure. To the remaining mixture was added a solution of 50 milliliters of concentrated hydrochloric acid and 160 milliliters of water. The resulting water solution was treated with 25 grams of sodium hydroxide, a solid separated, and the mixture was filtered. The precipitate was dried in a vacuum oven to give three grams of dimethylaminomethyl 3-indolyl ketone which after recrystallization from isopropanol melted between 205 and 208 degrees centigrade.

*Anal.*—Calcd. for $C_{12}H_{14}N_2O$: C, 71.25; H, 6.97; N, 13.85. Found: C, 71.15; H, 7.14; N, 13.64.

B. *3-(2-dimethylamino-1-hydroxyethyl)-indole*

To a solution of dimethylaminomethyl 3-indolyl ketone (0.7 gram, 0.0035 mole) in ten milliliters of methanol was added a solution of 0.49 gram (0.0129 mole) of sodium borohydride in eight milliliters of methanol. The reaction mixture was stirred for one hour during which time the temperature rose to about 35 degrees centigrade. The mixture was diluted with 25 milliliters of water, saturated with potassium carbonate, and extracted with three 25-milliliter portions of ether. The combined ether extracts were dried with anhydrous potassium carbonate and then concentrated to dryness to yield 0.6 gram of crude 3-(2-dimethylamino-1-hydroxyethyl)-indole in solid condition.

The resulting solid was heated to about 45 degrees centigrade with about five milliliters of ethyl acetate and the mixture was filtered, a small amount of unchanged dimethylamino-methyl 3-indolyl ketone being retained by the filter. About ten milliliters of Skellysolve B was added to the filtrate and the resulting solution was chilled to zero degrees centigrade, whereupon the mixture became gelatinous. White plates were obtained by concentrating the mixture to dryness under reduced pressure. This material was dissolved in about five milliliters of ethylene dichloride and the solution was diluted with about ten milliliters of Skellysolve B. Chilling to zero degrees centigrade gave a gelatinous mixture. This mixture was further chilled to about minus thirty degrees centigrade and filtered. The solid remaining on the filter was washed with Skellysolve B, chilled to about minus thirty degrees centigrade, partially air-dried on the filter, and dried in a vacuum oven at about forty degrees centigrade. There was thus obtained 0.2 gram of 3-(2-dimethylamino-1-hydroxyethyl)-indole which gave a bright orange-red color in concentrated hydrochloric acid, softened at 75 degrees centigrade and melted at 118–121 degrees centigrade, and gave the following analysis:

*Anal.*—Calcd. for $C_{12}H_{16}N_2O$: C, 70.55; H, 7.89; N, 13.72. Found: C, 70.41; H, 7.97; N, 13.52.

Infrared analysis indicated the absence of a carbonyl group, and the presence of hydrogen-bonded hydroxyl, imino (—NH), and an indolyl radical.

EXAMPLE 2.—PREPARATION OF 3-(2-BENZYL-METHYLAMINO-1-HYDROXYPROPYL)-INDOLE

A. *1-(benzylmethylamino)-ethyl 3-indolyl ketone*

A Grignard reagent was prepared from 32.4 grams of ethyl bromide and eight grams of magnesium in 600 milliliters of dry ether and to this Grignard was added 35.1 grams of indole. The mixture was refluxed for thirty minutes, cooled in an ice bath, stirred, and thereupon reacted with 64.5 grams of α-bromopropionyl bromide dissolved in 500 milliliters of ether. The cooled mixture was hydrolyzed by the addition of dilute acetic acid and a solid separated which was filtered, dried, and twice recrystallized from benzene-methyl cyclohexane to yield 22 grams of 1-bromoethyl 3-[1-(α-bromopropionyl) indolyl] ketone, melting at 168–170 degrees centigrade.

*Anal.*—Calcd. for $C_{14}H_{13}Br_2NO_2$: C, 43.43; H, 3.30. Found: C, 43.68; H, 3.25.

A solution of 12.6 grams of 1-bromoethyl 3[1-(α-bromopropionyl) indolyl] ketone was prepared in 200 milliliters of benzene and to this solution was added 12.1 grams of benzylmethylamine, and the mixture was then refluxed for three hours. The mixture was cooled, poured into dilute acid, and a gummy oil, insoluble in both the water and benzene layers, was formed. The oil was separated by decantation, and dilute ammonium hydroxide was added which converted the gummy oil to a solid. After three recrystallizations from isopropanol seven grams of 1-(benzylmethylamino)-ethyl 3-indolyl ketone melting at 179–180 degrees centigrade was obtained. Analytical data established that the substituent in the 1-position was lost in the reaction while the bromopropionyl group in the 3-position reacted to give the above benzylmethylamino derivative.

*Anal.*—Calcd. for $C_{19}H_{20}N_2O$: C, 78.04; H, 6.89. Found: C, 77.98; H, 6.39.

B. *3-(2-benzylmethylamino-1-hydroxypropyl)-indole*

In the same manner as shown in Example 1, part B, 3-(2-benzylmethylamino-1-hydroxypropyl)-indole is prepared by reducing 1-(benzylmethylamino)-ethyl 3-indolyl ketone with sodium borohydride.

EXAMPLE 3.—PREPARATION OF 3-(3-DIMETHYL-AMINO-1-HYDROXYPROPLY)-INDOLE

A. *2-dimethylaminoethyl 3-indolyl ketone*

In the same manner as shown in Example 2, 2-dimethylaminoethyl 3-indolyl ketone was prepared by utilizing β-chloropropionyl chloride and dimethylamine in lieu of α-bromopropionyl bromide and benzylmethylamine. The compound melted between 116 and 118.5 degrees centigrade.

*Anal.*—Calcd. for $C_{13}H_{16}N_2O$: C, 72.19; H, 7.46; N, 12.96. Found: C, 72.37; H, 7.28; N, 12.72.

B. *3-(3-dimethylamino-1-hydroxypropyl)-indole*

A solution of one-half gram of 2-dimethylaminoethyl 3-indolyl ketone in five milliliters of methanol was added to a solution of sodium borohydride (0.5 gram) in ten milliliters of methanol. The solution was stirred at 25 degrees centigrade for six hours. Water was added and the mixture was extracted three times with ether. The extracts were washed twice with saturated salt solution, dried over sodium sulfate, and evaporated to dryness to yield 0.48 gram (95 percent yield) of 3-(3-dimethylamino-1-hydroxypropyl)-indole melting between 144 to 146 degrees centigrade. Recrystallization from benzene-methanol resulted in 3-(3-dimethylamino-1-hydroxypropyl)-indole melting between 149 degrees to 151 degrees centigrade.

*Anal.*—Calcd. for $C_{13}H_{18}N_2O$: C, 71.52; H, 8.31; N, 12.84. Found: C, 71.74; H, 8.36; N, 12.83.

C. *3-(3-dimethylamino-1-hydroxypropyl)-indole methobromide*

To a solution of 0.20 gram of 3-(3-dimethylamino-1-hydroxypropyl)-indole in fifteen milliliters of anhydrous acetone was added 1.1 milliliters of cold methyl bromide. The reaction mixture was kept in a tightly closed flask for two hours at room temperature, at which time a gum had precipitated. The mixture was maintained at minus fifteen degrees centigrade for 48 hours, the solvent was decanted, and the gum was triturated with fifteen milliliters of anhydrous ether. There was thus obtained 0.23 gram of 3-(3-dimethylamino-1-hydroxypropyl)-indole methobromide as a water-soluble, white solid.

Other 1 - hydro - 3 - (amino - 1 - hydroxyhydrocarbyl) - indoles prepared by the process of the present invention include the following: 3 - (2 - phenyl - 2 - dimethylamino - 1 - hydroxyethyl) - indole, 5 - benzhydryloxy - 3 - [3 - (α - naphthyl) - 3 - ethyl - 4 - diethylamino - 1 - hydroxybutyl] - indole, 4 - chloro - 3 - [γ - pyridyl) - hydroxymethyl] - indole, 2 - methyl - 3 - (3 - methyl - 4 - morpholino - 1 - hydroxybutyl) - indole, 2 - phenyl - 3 - (3 - phenethyl -

3 - dimethylamino - 1 - hydroxypropyl) - indole, 5 - hydroxy - 3 - (2 - benzyl - 3 - methylamino - 1 - hydroxypropyl) - indole, 6 - methoxy - 3 - (3 - phenyl - 3 - benzylmethylamino - 1 - hydroxypropyl) - indole, 5 - benzyloxy - 3 - (2 - dibenzylamino - 1 - hydroxypropyl) - indole, 3 - (4 - dimethylamino - 1 - hydroxybutyl) - indole, 2 - (para - chlorophenyl) - 3 - (3 - ethylmethylamino - 1 - hydroxypropyl) - indole, 4 - dimethylamino - 3 - (4 - pyrrolidino - 1 - hydroxybutyl) - indole, 2 - phenyl - 3 - [2 - (α - naphthyl) - 5 - dimethylamino - 1 - hydroxyamyl] - indole, 5 - (para - chlorobenzyloxy) - 3 - (2 - ethyl - 4 - benzylamino - 1 - hydroxybutyl) - indole, 2 - benzyl - 3 - (2 - ethyl - 3 - dibenzylamino - 1 - hydroxypropyl) - indole, 5 - methyl - 3 - (3 - ethyl - 6 - dimethylamino - 1 - hydroxyhexyl) - indole, 2,5 - diphenyl - 3 - (3 - diphenylamino - 1 - hydroxypropyl) - indole, 6 - benzyl - 3 - (4 - ethyl - 4 - dibenzylamino - 1 - hydroxybutyl) - indole, 5 - phenoxy - 3 - (2 - phenethyl - 3 - ethylamino - 1 - hydroxypropyl) - indole, 1 - benz - (g) - 3 - (4 - dibutylamino - 1 - hydroxybutyl) - indole, 3 - [(β - pyridyl) - hydroxymethyl] - indole, 3 - [(1 - isoquinolyl) - hydroxymethyl] - indole, 5 - acetoxy - 3 - (3 - phenethyl - 3 - diphenylamino - 1 - hydroxypropyl) - indole, 2 - methyl - 5 - carbethoxy - 3 - (3 - amino - 1 - hydroxypropyl) - indole, 4 - carboxy - 3 - (2 - anilino - 1 - hydroxyethyl) - indole, 4 - cyano - 3 - (3 - dipropylamino - 1 - hydroxypropyl) - indole, and the like. Other quaternary ammonium and acid addition salts prepared by the present process include 3 - (2 - dimethylamino - 1 - hydroxyethyl) - indole ethobromide, 3 - (2 - diethylamino - 1 - hydroxyethyl) - indole benzyl chloride, 3 - (2 - benzylmethylamino - 1 - hydroxypropyl) - indole dimethyl sulfate, 3 - (3 - dimethylamino - 1 - hydroxypropyl) - indole methyl para - toluenesulfonate, 3 - (2 - phenyl - 2 - dimethylamino - 1 - hydroxyethyl) - indole hydrochloride, 2 - methyl - 3 - (3 - methyl - 4 - morpholino - 1 - hydroxybutyl) - indole pyruvate, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. In a process for the preparation of 1-hydro-3-(amino-1-hydroxyhydrocarbyl)-indoles including salts thereof, the step of reducing with sodium borohydride a compound having the general formula:

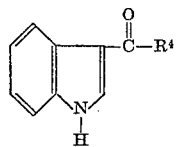

wherein $R^4$ is selected from the group consisting of an N-heterocyclic amino radical attached at a carbon position and

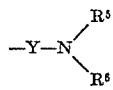

wherein Y is selected from the group consisting of lower-alkylene and lower-alkylene substituted phenyl radicals, $R^5$ is selected from the group consisting of hydrogen, aryl, aralkyl, and lower-alkyl, $R^6$ is selected from the group consisting of aryl, aralkyl, and lower-alkyl, and additional members wherein $R^5$ and $R^6$ together with —N< form a monoheterocyclic amino radical to produce a 1-hydro-3-(amino-1-hydroxyhydrocarbyl)-indole.

2. In a process for the preparation of 1-hydro-3-(amino-1-hydroxyhydrocarbyl)-indoles including salts thereof, the step of reducing with sodium borohydride a compound having the general formula:

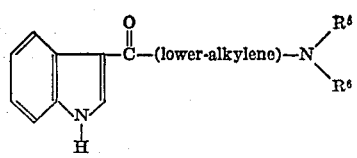

wherein $R^5$ is selected from the group consisting of hydrogen, aryl, aralkyl, and lower-alkyl, $R^6$ is selected from the group consisting of aryl, aralkyl, and lower-alkyl, and additional members wherein $R^5$ and $R^6$ together with —N< form a monoheterocyclic amino radical to produce a 1-hydro-3-(amino-1-hydroxyhydrocarbyl)-indole.

3. In a process for the preparation of 1-hydro-3-(amino-1-hydroxyhydrocarbyl)-indoles including salts thereof, the step of reducing a compound having the general formula:

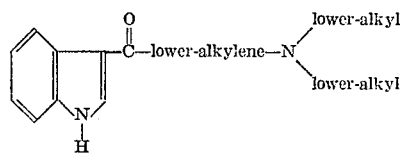

with sodium borohydride to produce a 1-hydro-3-(amino-1-hydroxyhydrocarbyl)-indole.

4. In a process for the preparation of 1-hydro-3-(amino-1-hydroxyhydrocarbyl)-indoles including salts thereof, the step of reducing a compound having the general formula:

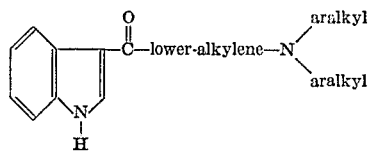

with sodium borohydride to produce a 1-hydro-3-(amino-1-hydroxyhydrocarbyl)-indole.

5. In a process for the preparation of 1-hydro-3-(amino-1-hydroxyhydrocarbyl)-indoles including salts thereof, the step of reducing a compound having the general formula:

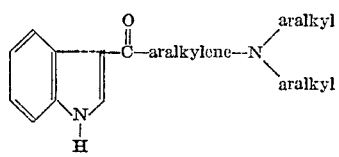

with sodium borohydride to produce a 1-hydro-3-(amino-1-hydroxyhydrocarbyl)-indole.

6. In a process for the preparation of 1-hydro-3-(amino-1-hydroxyhydrocarbyl)-indoles including salts thereof, the step of reducing a compound having the general formula:

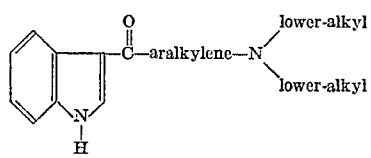

with sodium borohydride to produce a 1-hydro-3-(amino-1-hydroxyhydrocarbly)-indole.

7. In a process for the preparation of 3-(2-dimethylamino-1-hydroxyethyl)-indole, the step of reducing dimethylaminomethyl 3-indolyl ketone with sodium borohydride to produce 3-(2-dimethylamino-1-hydroxyethyl)-indole.

8. In a process for the preparation of 3-(3-dimethylamino-1-hydroxypropyl)-indole, the step of reducing 2-dimethylaminoethyl 3-indolyl ketone with sodium borohydride to produce 3-(3-dimethylamino-1-hydroxypropyl)-indole.

9. A compound selected from the group consisting of those having the general formula:

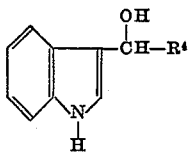

wherein $R^4$ is selected from the group consisting of an N-heterocyclic amino radical attached at a carbon position and

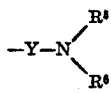

wherein Y is selected from the group consisting of lower-alkylene and aralkylene radicals containing not more than fifteen carbon atoms, $R^5$ is selected from the group consisting of hydrogen, aryl, aralkyl, and lower-alkyl, $R^6$ is selected from the group consisting of aryl, aralkyl, and lower-alkyl, and $R^5$ and $R^6$ together contain not more than 15 carbon atoms, and additional members wherein $R^5$ and $R^6$ together with —N< form a mono-heterocyclic amino radical, and acid addition and quaternary ammonium salts thereof.

10. A compound having the general formula:

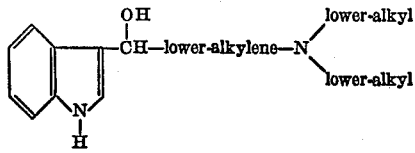

11. A compound having the general formula:

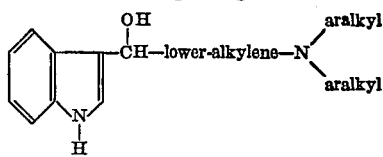

12. 3-(2-dimethylamino-1-hydroxyethyl)-indole.
13. 3-(3-dimethylamino-1-hydroxypropyl)-indole.
14. 3-(3-dimethylamino - 1 - hydroxypropyl) - indole methobromide.
15. 3-(2-benzylmethylamino-1-hydroxypropyl)-indole.
16. A compound have the general formula:

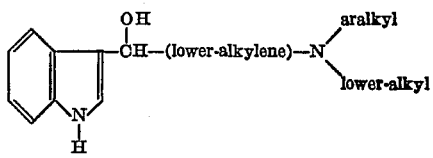

References Cited in the file of this patent
UNITED STATES PATENTS 2,692,882     Speeter _____ Oct. 26, 1954
2,708,197     Speeter _____ May 10, 1955

OTHER REFERENCES

Jour. Am. Chem. Soc., vol. 70, pages 174–179 (1948).